(12) United States Patent
Gabrel

(10) Patent No.: US 6,478,046 B2
(45) Date of Patent: Nov. 12, 2002

(54) GAS PRESSURE REGULATOR

(76) Inventor: Stanely Gabrel, 3355 N. Ridge Ave., Arlington Heights, IL (US) 60004

( * ) Notice: Subject to any disclaimer, the term of this patent is extended or adjusted under 35 U.S.C. 154(b) by 0 days.

(21) Appl. No.: 09/766,138

(22) Filed: Jan. 20, 2001

(65) Prior Publication Data

US 2002/0096216 A1 Jul. 25, 2002

(51) Int. Cl.$^7$ ............................................. G05D 16/10
(52) U.S. Cl. ................................. 137/505.42; 251/324
(58) Field of Search ........................... 137/505, 505.42; 251/319, 324, 325

(56) References Cited

U.S. PATENT DOCUMENTS

| | | | |
|---|---|---|---|
| 1,190,514 A | | 7/1916 | Cash |
| 3,885,589 A | * | 5/1975 | Lung .......................... 137/613 |
| 4,062,356 A | * | 12/1977 | Merrifield ............... 137/505.42 |
| 4,637,439 A | | 1/1987 | Jeans .......................... 141/18 |
| 4,840,195 A | | 6/1989 | Zabrenski .................. 137/312 |
| 5,186,393 A | | 2/1993 | Yie .............................. 239/583 |
| 5,657,787 A | * | 8/1997 | Diehl et al. ............... 137/116.5 |
| 5,678,602 A | * | 10/1997 | Cannet et al. ............... 137/613 |
| 5,755,213 A | | 5/1998 | Gardner et al. ................ 124/73 |
| 5,890,512 A | | 4/1999 | Gotthelf et al. .......... 137/484.6 |
| 5,899,221 A | * | 5/1999 | Holt et al. ............... 137/116.5 |
| 5,899,223 A | * | 5/1999 | Shuman, Jr. ........... 137/505.25 |
| 5,957,119 A | | 9/1999 | Perry et al. .................... 124/73 |

* cited by examiner

Primary Examiner—Stephen M. Hepperle
(74) Attorney, Agent, or Firm—IP Focus Law Group, Ltd.

(57) ABSTRACT

An improved pressure regulator suitable for use with paint ball guns comprises a hollow valve body and a valve mechanism for selectively releasing gas from a gas source to an output. The valve body has a unitary coupling portion, a fill port, an output port, a discharge opening, and an inlet opening. The valve body defines two confined flow passageways. The first connecting the plug chamber and the discharge opening. The second connecting the fill port and the inlet opening. The valve mechanism includes a regulator seat, a polymeric valve plug movable within the plug chamber for sealing engagement with the regulator seat, and a fluid barrier axially movable with respect to the valve body. A spring is provided for urging the fluid barrier toward the regulator seat.

24 Claims, 5 Drawing Sheets

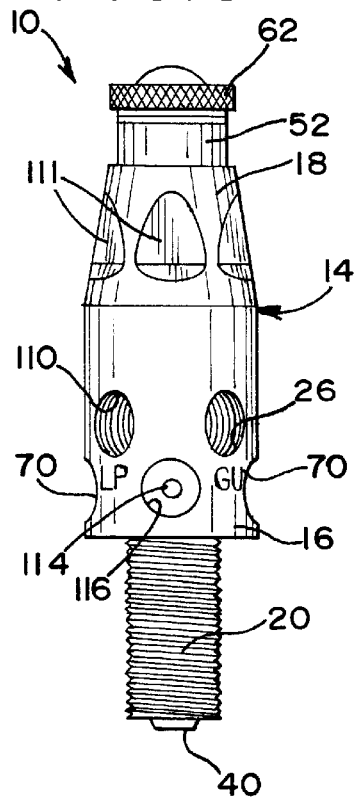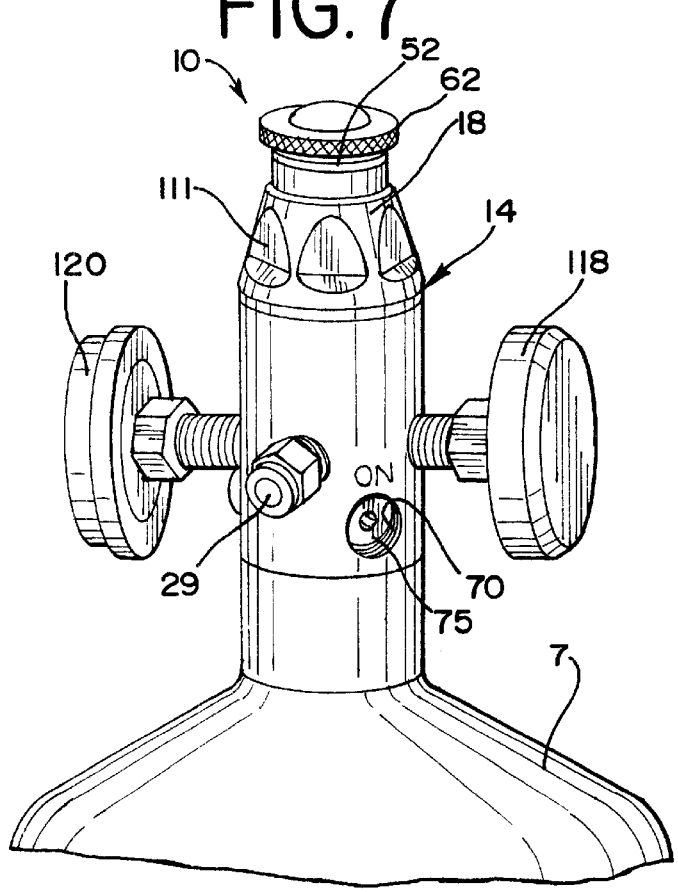

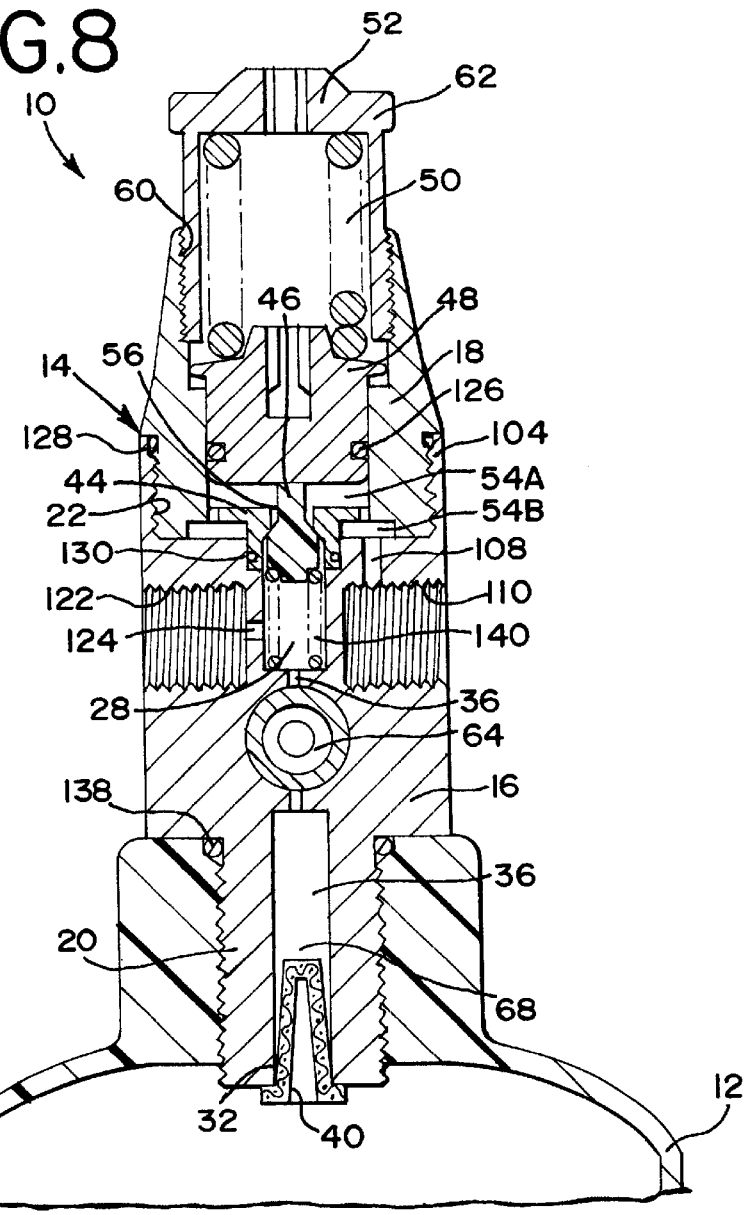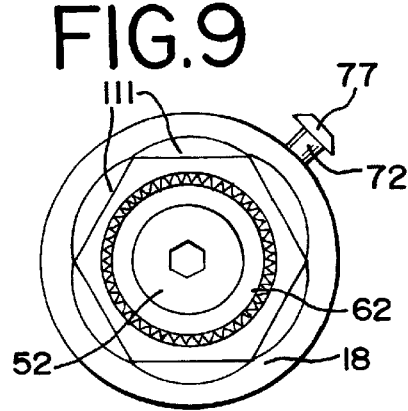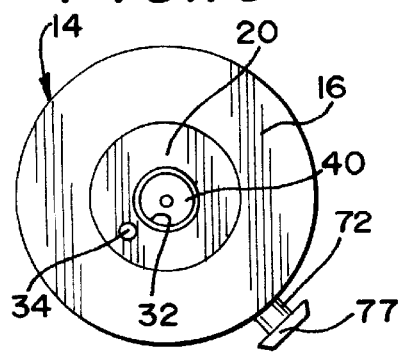

GAS PRESSURE REGULATOR

FIELD OF THE INVENTION

This invention relates to gas pressure regulators and more particularly to gas pressure regulators suitable for paint ball guns.

BACKGROUND OF THE INVENTION

A variety of targeting and simulated battle games (e.g. capture the flag) have been made possible by paint ball marking guns. These guns launch a ball of paint with a frangible shell that is designed to hold the ball shape until striking an object after firing. Upon striking the object, the ball is set to break open leaving a paint spot.

Paint-ball guns typically employ a firing system powered by compressed gas such as air. Compressed air is supplied from a supply tank which is mounted to or carried with the gun. The gun systems are equipped with pressure regulators which receive gas from the tank at a relatively high pressure and deliver gas at a reduced, more consistent pressure. Whether the gun tank is freshly charged or half-spent, the regulator ideally delivers gas at the same desired pressure. The gas regulators also typically include a port for recharging the tank.

Operating (as businesses) throughout the United States are outdoor paint-ball gun ranges, where paint-ball guns can be rented and outdoor space is provided for target shooting and battle games. Such rented paint-ball gun equipment undergoes repeated tank recharging and frequent, rugged use. When used in this difficult rental service, conventional paint-ball gun equipment requires frequent maintenance. In particular, available gas pressure regulators frequently malfunction due to mechanical fouling with dirt and paint from mishandled balls.

What is needed is a robust, lower-maintenance pressure regulator suitable for use with marking guns. Accordingly, the present invention provides a pressure regulator suitable for use with paint-ball gun equipment and including special features to improve reliability and prevent malfunction.

SUMMARY OF THE INVENTION

Pressure regulators of the present invention provide output pressure control for rugged use. Notably, the system of the present invention reduces the need for component replacement and cleaning.

Pressure regulators according to the present invention include a hollow valve body having a unitary coupling portion. The coupling portion is adapted for sealed connection to a source of pressurized gas. The hollow valve body defines a fill port, an output port, a discharge opening, and an inlet opening. The discharge and inlet openings are located in the coupling portion and are each in communication with the gas source.

The hollow valve body also defines a first confined flow passageway in communication between the plug chamber and the discharge opening and a second confined flow passageway in communication between the fill port and the inlet opening.

The regulator also includes a valve mechanism in the valve body for controlling the flow of gas from the gas source to the output port. The valve mechanism includes a regulator seat, a polymeric valve plug positioned in and movable within the plug chamber for sealing engagement with the regulator seat. The valve mechanism also includes a fluid barrier axially movable with respect to the valve body, that together with the regulator seat, defines a plenum chamber in communication with the output port. A biasing actuator (preferably a spring with cap) is provided for urging the fluid barrier toward the regulator seat.

Accordingly, the regulator receives high pressure gas from the source of pressurized gas and outputs the same gas at a lower relatively consistent pressure.

In a preferred embodiment, the regulator has a spool valve in the first confined flow passageway for turning off the flow of gas from the gas source. The spool valve includes a spool with opposing ends slidably engaged in a transverse socket defined in the valve body. The opposing ends of the spool have tabs for convenient finger actuation. The spool valve is a two-position three-way valve movable from a first position where the passageway is open between the gas source and the plug chamber, and a second position wherein the passageway portion towards the gas source is blocked and the passageway portion towards the plug chamber is open to space around the regulator.

An embodiment of the present invention can be described as follows. The pressure regulator comprises a manifold base, a fluid barrier subassembly, and a polymeric valve plug. The manifold base has a unitary coupling portion at one end and an open opposite end, to which the fluid barrier subassembly is mounted. The manifold base also includes a fill port and an output port. The coupling portion is adapted for sealed connection to a gas source such as a supply tank. The manifold base defines a series of important features: an axial valve guide socket in the open end, a first opening at the coupling portion, a first confined flow passageway in communication between the first opening and the guide socket, a second opening in the coupling portion and a second confined flow passageway in communication between the second opening and the fill port.

The fluid barrier subassembly is mounted to the open end of the manifold base. The fluid barrier subassembly includes a barrier housing, a fluid barrier movable within the barrier housing, a regulator seat positioned between the fluid barrier and the guide chamber, and a tension adjustable bias actuator urging the fluid barrier toward the regulator seat. The valve seat and the guide socket together define an inner guide chamber in communication with the first confined flow passageway and an outer plenum chamber.

The polymeric valve plug is positioned in the socket and moveable therein for sealing engagement with the regulator seat.

BRIEF DESCRIPTION OF THE DRAWINGS

In the accompanying drawings that form part of the specification, and in which like numerals are employed to designate like parts throughout the same.

FIG. 6 is a side elevation view of the regulator shown in FIG. 1 with supply tank omitted;

FIG. 7 is a simplified perspective view of a regulator according to the present invention mounted to a compressed gas tank;

FIG. 8 is a vertical cross-sectional view of the regulator shown in FIG. 1 provided to illustrate details of the gauge ports;

FIG. 9 is an enlarged top plan view of the regulator shown in FIG. 1; and

FIG. 10 is an enlarged bottom plan view of the regulator shown in FIG. 1.

DESCRIPTION OF THE PREFERRED EMBODIMENTS

Figure 1:
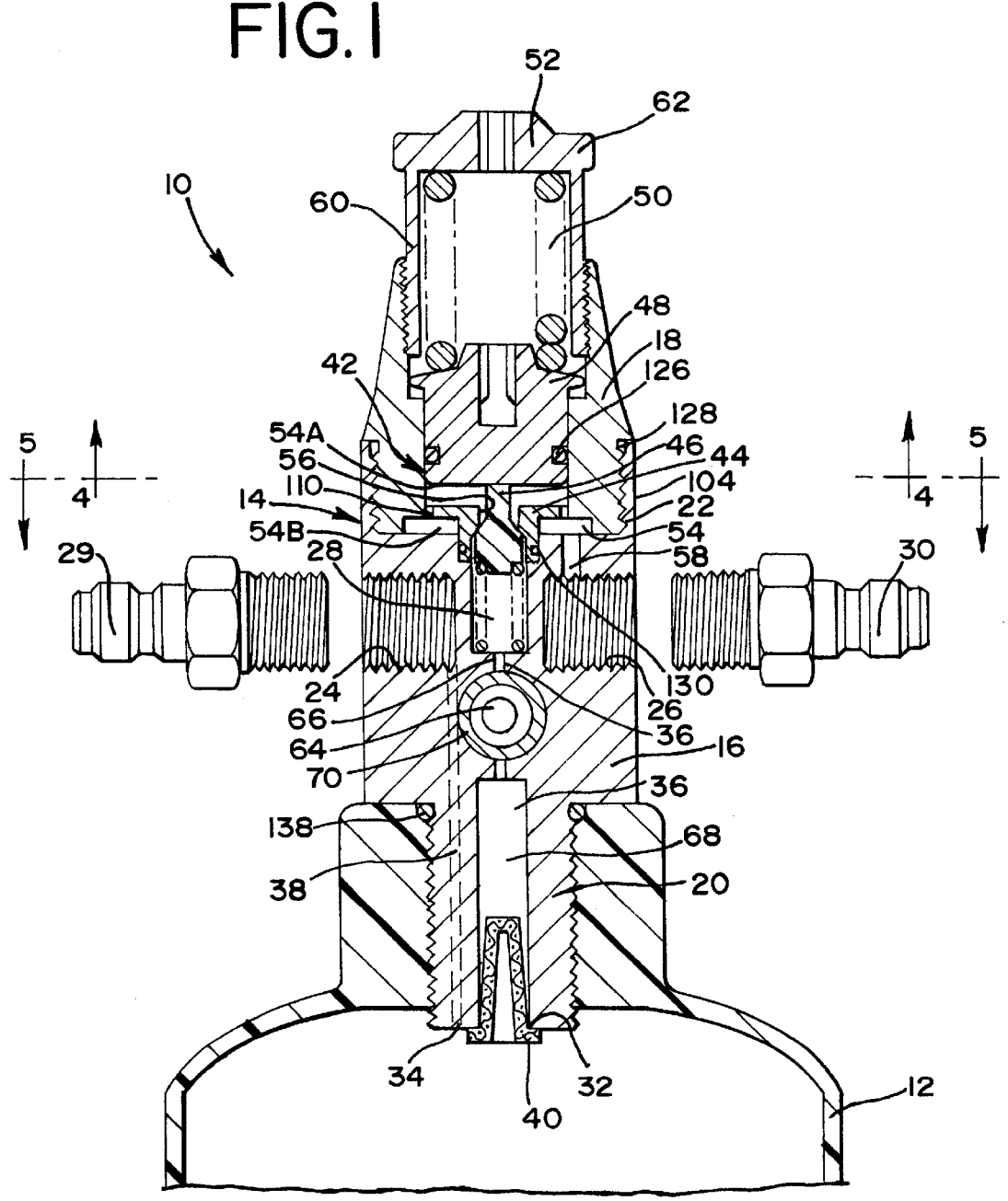
FIG. 1 is a vertical cross-sectional view of a pressure regulator according to the present invention and selected to show details of the confined flow passageways, the plug guide chamber, the plenum chamber and the input and output ports.

The invention disclosed herein is, of course, susceptible of embodiment in may different forms. Shown in the drawings and described hereinbelow in detail are preferred embodiments of the invention. It is to be understood, however, that the present disclosure is an exemplification of the principles of the invention and does not limit the invention to the illustrated embodiments.

Referring now to FIG. 1, a pressure regulator 10 according to the present invention is shown mounted to a tank 12. Pressure regulator 10 includes a hollow valve body (or main body) 14. Valve body 14 is preferably a subassembly of two structural parts, a base 16 and a piston housing 18.

Unitary with valve body base 16 is a coupling portion 20 extending away from valve body 14. Coupling portion 20 is adapted for sealed connection to a gas source. As illustrated, the source of compressed gas is typically a tank 12 and the outside surface of coupling portion 20 is then threaded for sealed connection to tank 20. In an alternate arrangement, the gas source takes the form of a fitting extending. by hose from a more remote tank, in which case the coupling portion has a configuration for sealed connection to the gas supply fitting.

Opposite coupling portion 20 valve body base 16 has an open end 22. Between open end 22 and coupling portion 20, valve body base 16 defines a fill port 24, an output (gun) port 26 and an inner plug chamber 28 axially aligned with valve body 14. Accordingly, valve body base 16 acts as a manifold. As used herein, the phrase port is a general reference to gas flow inlets to or outlets from a body, chamber, or manifold etc.

Fill port 24 and output port 26 preferably include respective port adapters 29 and 30 received in the threaded port sockets. Fill port adapter 29 includes an internal seal holder, i.e. check valve (not shown) to seal pressurized gas into tank 12 following a filling operation. An internal mesh filter may also be provided in the adapter for filter dust, etc., from supply tank 12 and the regulator system.

At coupling portion 20, valve body base 16 defines a discharge opening 32 and an inlet opening 34, each in communication with tank 12. Extending between discharge opening 32 and plug chamber 28 is a first confined flow passageway 36. Passageway 36 delivers compressed gas from tank 12 into plug chamber 28. Providing a path for compressed gas to enter tank 12 is a second confined flow passageway 38 extending between fill port 24 and inlet opening 34.

First confined flow passageway 36 is preferably equipped with a contoured mesh filter 40. Filter 40 prevents particles and other gas impurities from entering and fouling the regulator valve mechanisms. A suitable sintered brass filter of 40 microns is commercially available from Capstan Permaflow (Gardena, Calif.).

Regulator 10 includes a valve mechanism 42 for controlling the flow of gas from tank 12 to output port 26. Valve mechanism 42 is comprised of a regulator seat (or valve seat) 44, a valve plug 46 positioned in chamber 28, a fluid barrier in the form of a piston 48 and a biasing actuator in the form of a spring 50 with cap 52.

Piston 48 is axially movable within piston housing 18. Piston 48 and regulator seat 44 together define a plenum (or outer) chamber 54. Regulator seat 44, which is preferably unitary with piston housing 18, and defines an orifice (or opening) 56. Valve plug 46 is movable within plug chamber 28 for sealing engagement with regulator seat 44. Plenum chamber 54 is in gas communication with output port 26 via openings 58.

Piston housing 18 has an internally threaded open end 60 for receiving threaded cap 52. Helical spring 50 together with cap 52 urge piston 48 towards regulator seat 44. The threaded connection allows cap 52 to serve as a tension adjustment by turning, and therefore, an adjustment of the output pressure as further explained below. As such, cap 52 includes a crown 62 with a knurled gripping surface.

In a preferred embodiment, regulator 10 is equipped with an on-off valve 64 for selectively blocking the flow of gas from tank 12 to plug chamber 28, and ultimately output port 26. On-off valve 64 is operably associated with the first passageway 36, dividing it into an upper portion 66 and a lower portion 68. The mechanism for the on-off valve 64 is mounted within a transverse socket 70 defined in the valve body base 16.

Figure 2:
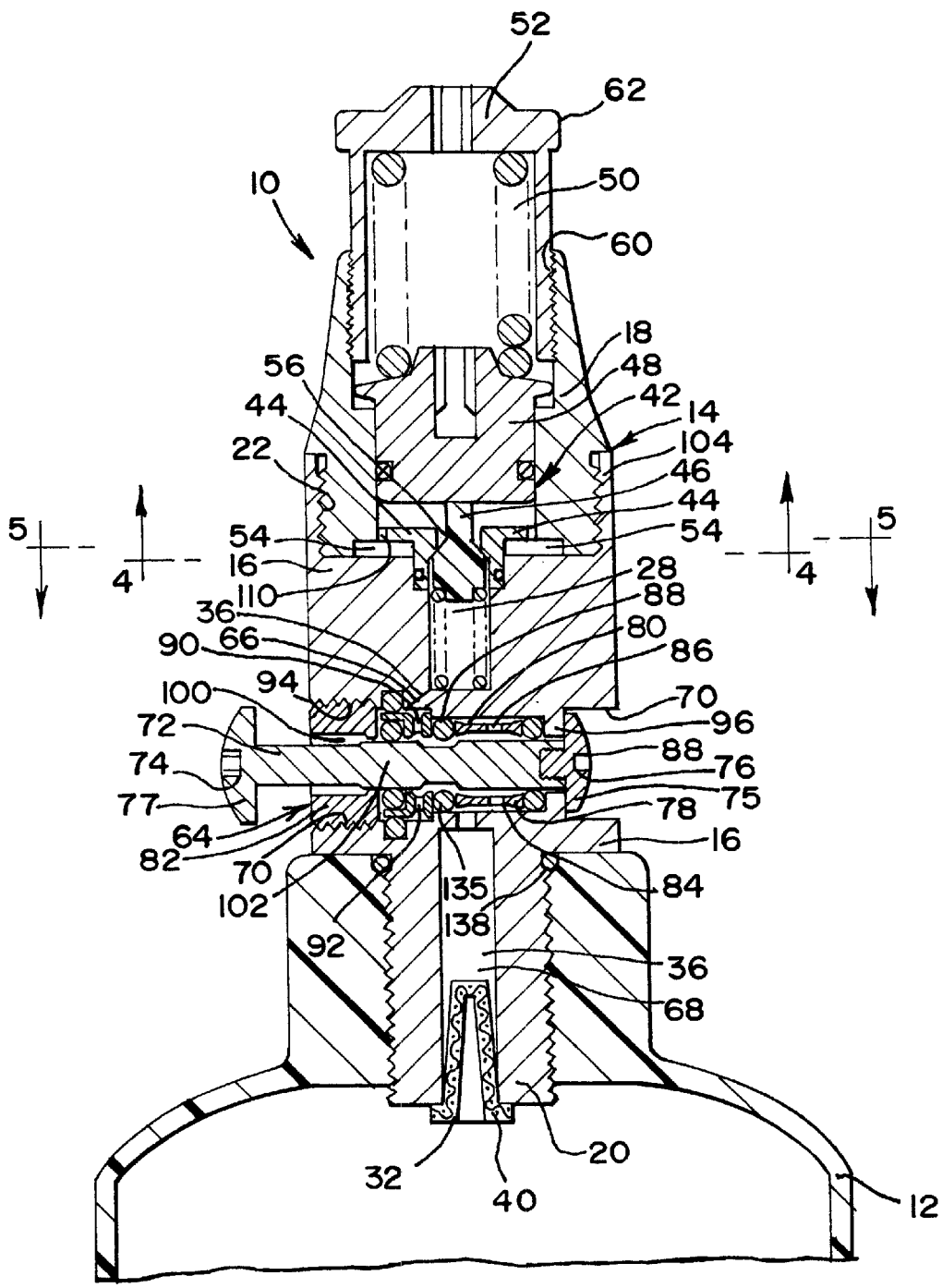
FIG. 2 is a vertical cross-sectional view of the regulator shown in FIG. 1 provided to illustrate details of the two-position three-way spool valve.
Figure 3:
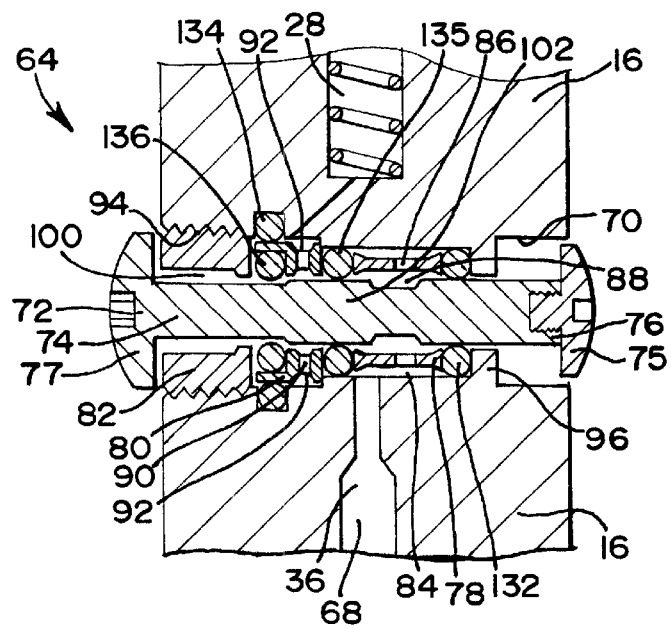
FIG. 3 is an enlarged fragmentary cross-sectional view showing the spool valve in the alternate off-position.

As illustrated in FIGS. 2 and 3, on-off valve 64 is preferably a spool type valve. Accordingly, on-off valve 64 includes a contoured spool 72 with opposing ends 74 and 76. Each end 74 and 76 includes a tab (or push button) 75 and 77, allowing spool 72 to be easily moved over operating positions. As illustrated, tab 77 is unitary with spool 72 while tab 75 is threadedly mounted.

A series of internal fittings 78, 80 and 82 create internal passages and, together with spool 72, chambers which provide a valving function. Having an outer contour, guide fitting 78 together with the side walls of socket 70 define an annular chamber 84 for receiving gas from portion 68. Guide fitting 78 defines passages 86 for delivering gas to the center spool space 88. Likewise, guide fitting 80 has passages 90 in communication with an annular chamber 92 allowing gas to flow from the center spool space to portion 66. Fitting 82 is threaded and screwed into a threaded portion 94 of socket 70. Fitting 82 together with socket inner flange 96 retains fittings 78 and 80 within socket 70.

On-off valve 64 is preferably a two-position, three-way valve movable from an on, or first position where gas flows from tank 12 to an off, or second, position where gas flow from tank 12 is blocked and plug chamber 28 is vented. The contours of spool 72 and the fittings 78, 80, 82 create movable inner annular chambers 88 and 100, and a movable plug portion 102.

Cross-sectional FIG. 2 shows on-off valve 64 in the on position, where gas can flow from tank 12 to portion 68 of first confined flow passageway 36, to chamber 84, through passage 86 of fitting 78 and then into inner chamber 88. From inner chamber 88, gas can then pass through passage 90 of fitting 80 into chamber 92 and then on to portion 66 of first passage 36. On-off valve 64 is preferably configured so that tab 75 of spool 72 is recessed within socket 70 when in the on position.

Fragmentary cross-sectional FIG. 3 is provided to show details of on-off valve 64 in the alternate off position. When on-off valve 64 is in the off position, plug portion 102 of spool 72 blocks the outlet of passage 86 of fitting 78 thereby preventing flow of gas from tank 12 towards the plug chamber 28. The off position leaves chamber 92 unsealed in the direction towards fitting 80 and tab 77. This unsealed configuration allows pressurized gas to safely escape from the output side of the regulator through plug chamber 28 and-portion 66 of first passageway 36, and chamber 92.

Figure 4:
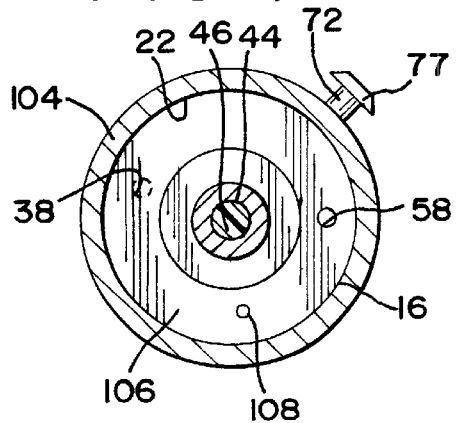
FIG. 4 is an enlarged horizontal cross-sectional view taken generally along the plane 4—4 of FIG. 1 with the supply tank omitted.

FIGS. 4 through 9 are alternate views showing preferred design details of the regulator illustrated in FIGS. 1 and 2. FIG. 4 is an.enlarged horizontal cross-sectional view of valve body 14 with the supply tank feature omitted. FIG. 4 shows side wall 104 and surface 106 of open end 22 of valve body base 16. FIG. 4 also shows the portion of regulator seat 44 which defines orifice 56, and valve plug 46. This view also reveals a vertical passageway 108 used to communicate output pressure to a gauge port 110 below (FIG. 6).

Figure 5:
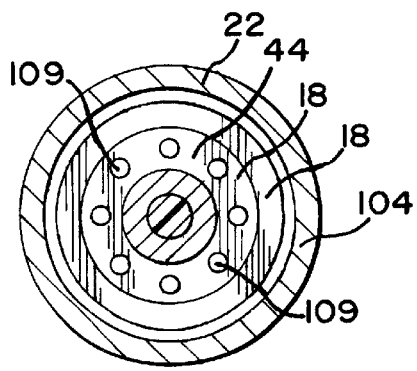
FIG. 5 is an enlarged horizontal cross-sectional view taken generally along the plane 5—5 of FIG. 1.

FIG. 5 is corresponding horizontal cross-section view in a direction opposite FIG. 4. FIG. 5 reveals the same side wall 104 of open end 22, piston housing 18, regulator seat 44 which is preferably unitary with the piston housing, piston housing 18 includes a plurality of circumferentially distributed openings 109 which connect upper portion 54A and lower portion 54B of plenum chamber 54 (FIG. 1).

FIG. 6 is a side elevation view of the regulator shown in FIG. 1 with supply tank 12 and spool 72 omitted. FIG. 6 shows the base 16 and the piston housing 18 of valve body 14. Piston housing 18 preferably includes contours 111 creating an overall hexagonal shape for receiving a wrench. The side view also reveals piston housing cap 52, coupling portion 20 and filter 40. As discussed above, valve body 14 includes an output port 26 and a socket 70 for on-off valve 64. Valve body 14 also includes an overpressure reliever in the form of a burst disc 114 mounted within a socket 116. Socket 116 is in gas communication with supply tank via a passageway (not shown) into annular chamber. FIG. 6 also shows output pressure port 110 for receiving a pressure gauge 118 (FIG. 7). Port 110 is in gas communication via a vertically extending passageway 108 (FIG. 4).

FIG. 7 is a simplified perspective view of regulator 10 according to the present invention. FIG. 7 reveals filling adapter 29 of fill port 24, socket 70 with tab 75 of on-off valve 64 and output pressure gauge 118 and a supply pressure gauge 120.

FIG. 8, a vertical cross-sectional view, shows output pressure gauge port 110 and supply pressure gauge port 122. Output pressure gauge port 110 communicates with plenum chamber 54 via vertical passageway 108 defined in valve body 14. Supply pressure gauge port 122 communicates with plug chamber 28 via a horizontal passageway 124.

The preferred design includes a number of O-ring seals. A polyurethane or other elastomeric material is suitable material of construction for the O-rings. Referring again to FIG. 1 and working from top to bottom, piston 48 has O-ring 126, the piston housing 18 with open end 22 connection uses an O-ring 128, regulator seat 44 has an O-ring 130 for sealing plug chamber 28 from plenum chamber 54. On-off valve 64 preferably uses at least four O-rings: O-ring 132 for fitting 78, O-ring 134 for sealing between fitting 80 and socket 70, O-ring 135 for sealing between insert fitting 80 and 78, and O-ring 136 for fitting 82. Coupling portion 20 also includes an O-ring 138 to enhance the connection seal with tank 12.

A wide variety of conventional materials are suitable for making the components of regulators embodying the present invention. These materials include metals, notably steels, and various high-strength composites without limitation that all or any of the elements be made of the same material.

Valve body 14, including base 16 and piston housing 18, can be manufactured from a wide variety of materials having the requisite strength, rigidity and corrosion resistance. Aluminum and steel are suitable. A particularly preferred materials of construction are aluminum alloy 6061-T6, 302-304 stainless steel, 316 stainless steel.

The material of construction for valve plug 46 is preferably relatively rigid but softer than the material of construction of regulator seat 44. As noted above, regulator seat 44 is preferably unitary with piston housing 18. Therefore, valve plug 46 is preferably made from a polymeric material. Presently preferred are the fluoropolymer compounds such as polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) Most preferred is a polychlorotrifluoroethylene (PCTFE) commercially available from 3M Company under the designation "Kel-F."

Springs 50 and 140 are optionally made from music wire.

In operation, tank 12 is filled with on-off valve 64 in the off position. A supply hose (not shown) is connected to adapter 29 of fill port 24. When activated, compressed gas enters fill port 24 and moves through second passageway 38 to inlet opening 34 and then into supply tank 12. Hence, the present invention provides a regulator in which the refilling flow of compressed gas does not enter the plug chamber or other parts of the valve mechanism.

With output port connected to a compressed gas powered device such as a paint ball gun and on-off valve 64 in the on position, compressed gas moves from tank 12 through first confined flow passageway 32 and into plug chamber 28. More specifically, gas moves through the following spaces in sequence, portion 68 of first passageway 28, annular chamber 84, passage 86 of fitting 78, movable chamber 88, passage 90 of fitting 80, annular chamber 92, and portion 66 of first passage 36. From portion 66, compressed gas enters plug chamber 28.

From chamber 28, gas flow is dependent upon the operation of the valve mechanism. Pressure at output port 26 is communicated to spring-biased piston 48 thereby creating a balancing interaction between the force of spring 50 and the force of output pressure. As the output pressure falls, piston 48 is forced towards regulator seat 44 pushing and moving valve plug 46 towards plug chamber 28 allowing gas to flow around plug 46. Once released from plug chamber 28, gas flows through the following elements to pressurize the output: the upper portion 54A of plenum chamber 54, openings 109, lower portion 54B of plenum chamber 54, passage 58 and then output port 26.

Both the shape of valve plug 46 and the walls of orifice 56 are preferably tapered such that a portion of valve plug 46 can extend beyond orifice 56 of regulator seat 44 for a sealed engagement. As valve plug 46 is pushed down by piston 48, an annular opening is created between valve plug 46 and orifice 56 of regulator seat 44.

The desired output pressure can be selected by rotating cap 52 to adjust level of force pushing piston 48 towards regulator seat 44. For ease of understanding, gas flow from tank 12 to output port 26 has been described as a continuous phenomena. In regulating operation however, overall gas flow from tank 12 is intermittent, based on the action of piston 48 in response to changes in output pressure. When the output pressure drops quickly as when the attached paint ball gun is fired, regulator 10 acts rapidly to repressurize the paint ball gun.

When on-off valve 64 is returned to the off position, the flow of gas from tank 12 is blocked by moving plug 102 of spool 72 and output port 26 is vented as passage 90 of fitting 80 is left open to atmosphere.

Applicants note here that it is possible, of course, to label base 16 of the valve body and to then describe piston housing 18 as a part separate from the valve body. Both are equally valid conventions for describing regulators according to the present invention.

While specific specifications are generally not critical, the preferred operating parameters for regulators according to the present invention may be informative. Preferred regulators are equipped with a burst disk 114 set for pressures not to exceed about 5000 psi, with users told not to exceed a tank pressure of 3000 nPSI. The present regulators are preferably supplied with compressed nitrogen, $CO_2$ or clean air. The desired output pressure necessarily varies with the type of device to be powered. Typical paint ball guns call for a shooting pressure of about 400 to about 950 psi.

Pressure regulators according to the present invention have a number of beneficial features. For example, the separate refilling circuit protects internal valve components such as the valve plug and the regulator seat from the force, fouling and temperature change caused by the intense stream of refilling gas.

The foregoing specification and drawings are to be taken as illustrative but not limiting of the present invention. Still other configurations and embodiments utilizing the spirit and scope of the present invention are possible, and will readily present themselves to those skilled in the art.

I claim:

1. A regulator for receiving high pressure gas from a gas source and outputting lower pressure gas, the regulator comprising:

a hollow valve body having a coupling portion unitary therewith, the coupling portion being adapted for sealed connection to the gas source, the valve body defining a fill port, an output port, an inner plug chamber and discharge and inlet openings in the coupling portion, each in communication with the gas source, the valve body also defining a first confined flow passageway in communication between the plug chamber and the discharge opening, the valve body further defining a second confined flow passageway in communication between the fill port and the inlet opening; and a valve mechanism in the valve body for controlling the flow of gas from the gas source to the output port, the valve mechanism including a regulator seat, a monolighic polymeric valve plug positioned in the plug chamber and movable therein for sealing engagement with the regulator seat, a fluid barrier axially movable with respect to the valve body and together with the regulator seat defining a plenum chamber in communication with the output port, and a biasing actuator urging the fluid barrier toward the regulator seat.

2. The regulator according to claim 1 wherein the material of construction of the valve plug is a fluoropolymer compound.

3. The regulator according to claim 1 wherein the material of construction of the valve body is an aluminum.

4. The regulator according to claim 1 wherein the regulator seat is made of a material with a hardness greater than the valve plug.

5. The regulator according to claim 1 wherein the material of construction of the valve plug is a polychlorotrifluoroethylene (PCTFE).

6. The regulator according to claim 1 wherein the valve body has an open end opposite the coupling portion that forms a barrier housing for receiving the barrier, the biasing actuator being a spring compressed between the fluid barrier and a cap threadedly received in the open end whereby the cap can be turned to adjust the tension of the spring.

7. The regulator according to claim 1 wherein the coupling portion is a unitary fitting extending away from the valve body, the fitting having external threads for engaging a gas source.

8. The regulator according to claim 1 including an on-off valve operably associated within the first confined flow passageway for starting and stopping the flow of gas from the gas source.

9. The regulator according to claim 8 including a spool valve in the first confined flow passageway for turning off the flow of gas from the gas source.

10. A regulator for receiving high pressure gas from a gas source and outputting lower pressure gas, the regulator comprising:

a hollow valve body having a coupling portion unitary therewith, the coupling portion being adapted for sealed connection to the gas source, the valve body defining a fill port, an output port, an inner plug chamber and discharge and inlet openings in the coupling portion, each in communication with the gas source, the valve body also defining a first confined flow passageway in communication between the plug chamber and the discharge opening, the valve body further defining a second confined flow passageway in communication between the fill port and the inlet opening;

a valve mechanism in the valve body for controlling the flow of gas from the gas source to the output port, the valve mechanism including a regulator seat, a valve plug positioned in the plug chamber and movable therein for sealing engagement with the regulator seat, a fluid barrier axially movable with respect to the valve body and together with the regulator seat defining a plenum chamber in communication with the output port, and a biasing actuator urging the fluid barrier toward the regulator seat; and an on-off spool valve operably associated within the first confined flow passageway for starting and stopping the flow of gas from the gas source, wherein the spool valve includes a spool with opposing ends slidably engaged in a transverse socket defined in the valve body, at least one of the ends of the spool having a tab for finger actuation of the valve spool.

11. A regulator for receiving high pressure gas from a gas source and outputting lower pressure gas, the regulator comprising:

a hollow valve body having a coupling portion unitary therewith, the coupling portion being adapted for sealed connection to the gas source, the valve body defining a fill port, an output port, an inner plug chamber and discharge and inlet openings in the coupling portion, each in communication with the gas source, the valve body also defining a first confined flow passageway in communication between the plug chamber and the discharge opening, the valve body further defining a second confined flow passageway in communication between the fill port and the inlet opening;

a valve mechanism in the valve body for controlling the flow of gas from the gas source to the output port, the valve mechanism including a regulator seat, a valve plug positioned in the plug chamber and movable therein for sealing engagement with the regulator seat, a fluid barrier axially movable with respect to the valve body and together with the regulator seat defining a plenum chamber in communication with the output port, and a biasing actuator urging the fluid barrier toward the regulator seat; and an on-off spool valve operably associated within the first confined flow passageway for starting and stopping the flow of gas from the gas source, wherein the spool valve is a two-position three-way valve movable from a position where the first passageway is open between the gas source and the plug chamber and a second position wherein the first passageway towards the gas source is blocked and the first passageway to plug chamber is open to space around the regulator.

12. The regulator according to claim 1 including a valve plug spring positioned in the guide chamber urging the valve plug towards the valve seat.

13. regulator for receiving high pressure gas from a gas source and outputting lower pressure gas, the regulator comprising:

a hollow valve body including a base, a gas source coupling unitary with the base, and a piston housing, threadedly secured to an open end of the base and together with the open end defining an outer chamber, the coupling portion being adapted for sealed connection to the gas source, the valve body having an open end and defining an inner, axial guide chamber, an orifice between the guide chamber and the open end, the valve body also defining an output port in communication with the outer chamber, the valve body further defining a discharge opening in the coupling portion in communication with the gas source and a confined flow passageway in communication between the guide chamber and the opening;

a monolithic polymeric valve plug positioned in the inner guide chamber and movable therein for sealing engagement with the orifice;

a fluid barrier positioned in the piston housing and movable with respect to the valve body; and a biasing actuator urging the fluid barrier toward the regulator seat.

14. The regulator according to claim 13 wherein t e biasing actuator is force adjustable.

15. The regulator according to claim 13 wherein the piston housing has an open top and the biasing actuator includes a cap, theadedly secured to the open top and a spring in the piston housing and compressed by the cap such that the cap can be turned to adjust the biasing tension.

16. The regulator according to claim 13 wherein the valve body further defines a gauge port in fluid communication with the outer chamber for providing an indication of the output pressure.

17. The regulator according to claim 13 wherein the valve body further defines a gauge port in fluid communication with the guide chamber for providing an indication of the pressure of the gas source.

18. The regulator according to claim 13 including an overpressure reliever mounted to the valve body.

19. The regulator according to claim 18 wherein the overpressure reliever is a burst disk mounted to a socket defined in the valve body, the socket being in communication with the guide chamber.

20. The regulator according to claim 13 including an on-off valve operably associated within the confined flow passageway for starting and stopping the flow of gas from the gas source.

21. The regulator according to claim 13 including a spool valve in the confined flow passageway for turning off the flow of gas from the gas source.

22. A regulator for receiving high pressure gas from a gas source and outputting lower pressure gas, the regulator comprising:

a hollow valve body including a base, a gas source coupling unitary with the base, and a piston housing, threadedly secured to an open end of the base and together with the open end defining an outer chamber, the coupling portion being adapted for sealed connection to the gas source, the valve body having an open end and defining an inner, axial guide chamber, an orifice between the guide chamber and the open end, the valve body also defining an output port in communication with the outer chamber, the valve body further defining a discharge opening in the coupling portion in communication with the gas source and a confined flow passageway in communication between the guide chamber and the opening;

a polymeric valve plug positioned in the inner guide chamber and movable therein for sealing engagement with the orifice;

a fluid barrier positioned in the piston housing and movable with respect to the valve body; and a biasing actuator urging the fluid barrier toward the regulator seat; and a spool valve in the confined flow passageway for turning off the flow of gas from the gas source, wherein the spool valve includes a spool with opposing ends slidably engaged in a transverse socket defined in the valve body, at least one of the ends of the spool having a tab for finger actuation of the valve spool.

23. A regulator for receiving high pressure gas from a gas source and outputting lower pressure gas, the regulator comprising:

a hollow valve body including a base, a gas source coupling unitary with the base, and a piston housing, threadedly secured to an open end of the base and together with the open end defining an outer chamber, the coupling portion being adapted for sealed connection to the gas source, the valve body having an open end and defining an inner, axial guide chamber, an orifice between the guide chamber and the open end, the valve body also defining an output port in communication with the outer chamber, the valve body further defining a discharge opening in the coupling portion in communication with the gas source and a confined flow passageway in communication between the guide chamber and the opening;

a polymeric valve plug positioned in the inner guide chamber and movable therein for sealing engagement with the orifice;

a fluid barrier positioned in the piston housing and movable with respect to the valve body; and a biasing actuator urging the fluid barrier toward the regulator seat; and a spool valve in the confined flow passageway for turning off the flow of gas from the gas source, wherein the spool valve is a two-position three-way valve movable from a position where the first passageway is open between the gas source and the plug chamber and a second position wherein the first passageway towards the gas source is blocked and the first passageway to plug chamber is open to space around the regulator.

24. A gas pressure regulator for receiving high pressure gas from a gas source and outputting lower pressure gas, the regulator comprising:

a manifold base having at one end a gas source coupling portion unitary therewith, an open opposite end, a fill port, and an output port, the coupling portion being adapted for sealed connection to the gas source, the manifold base defining an axial valve guide socket in the open end, the manifold base also defining a first opening at the coupling portion and a first confined flow passageway in communication between the first opening and the guide chamber;

the manifold base further defining a second opening in the coupling portion and a second confined flow passageway in communication between the second opening and the fill port;

a fluid barrier subassembly mounted to the open end of the manifold base, the fluid barrier subassembly including a barrier housing, a fluid barrier movable within the barrier housing, a regulator seat positioned between the fluid barrier and the guide socket, and a tension adjustable bias actuator urging the fluid barrier toward the regulator seat, the valve seat and the guide socket together defining an inner guide chamber in communication with the first confined flow passageway and an outer plenum chamber; and a monolithic polymeric valve plug positioned in the socket and moveable therein for sealing engagement with the regulator seat.

* * * * *